Oct. 18, 1932.  J. M. HALL  1,882,830
SHOCK ABSORBER
Filed Aug. 26, 1925   3 Sheets-Sheet 1

Oct. 18, 1932.  J. M. HALL  1,882,830
SHOCK ABSORBER
Filed Aug. 26, 1925   3 Sheets-Sheet 2

Inventor
Joseph M. Hall
By Pobb+Powers
Attys.

Oct. 18, 1932.    J. M. HALL    1,882,830
SHOCK ABSORBER
Filed Aug. 26, 1925    3 Sheets-Sheet 3

Inventor
Joseph M. Hall
by Popp & Powers
Attys.

Patented Oct. 18, 1932

1,882,830

UNITED STATES PATENT OFFICE

JOSEPH M. HALL, OF HAMILTON, ONTARIO, CANADA, ASSIGNOR TO UNIVERSAL DRAFT GEAR ATTACHMENT CO., A CORPORATION OF ILLINOIS

SHOCK ABSORBER

Application filed August 26, 1925. Serial No. 52,627.

This invention relates to a shock absorber which is primarily intended for use as a friction draft gear for railroad cars to reduce the shock during pulling and pushing or buffing strains to which the car may be subjected, and which comprises in its organization a plurality of sets of intercalated friction plates which are adapted to be pressed laterally against each other and also to slide lengthwise rearwardly to each other during the operation of the gear.

The object of this invention is to so arrange the several elements that the over solid load is received on the center line of the draft gear and thereby permit of making the shock absorber more compact and stronger and capable of resisting heavier loads without giving way.

This object is attained primarily by providing a central post or stem which not only serves to limit the closing movement of the draft gear but also serves to receive the laterally inward pressure of the intercalated friction plates, and also in employing thrust springs which surround the releasing springs adjacent to the outer sides of the sets of friction plates.

In the accompanying drawings:—

Similar characters of reference indicate like parts in the several figures of the drawings.

Figure 1:
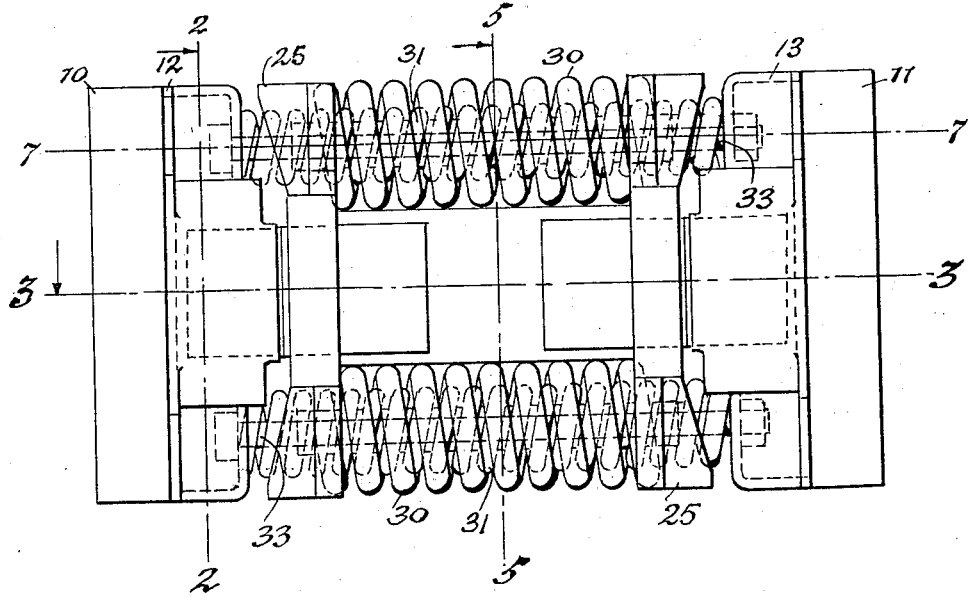
Figure 1 is a plan view of my improved shock absorber in a fully released or expanded position.
Figure 2:
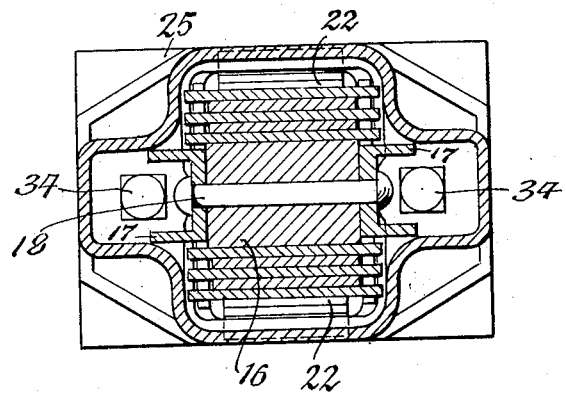
Figure 2 is a transverse section of the same taken on line 2—2, Fig. 1.

In the particular organization of my invention shown in the drawings, as an example of the preferred embodiment, the numerals 10, 11 represent two followers which are adapted to be arranged transversely relative to the longitudinal line of the pulling and pushing or buffing strains to which the car is subjected, which followers are slidingly supported at their opposite ends on the longitudinal sills or beams of the car frame or body in the usual and well known manner so that these followers can move one toward the other but the extent of their separation being limited by the usual draft lugs or stops on the sills which engage with the outer sides of these followers.

Figure 3:
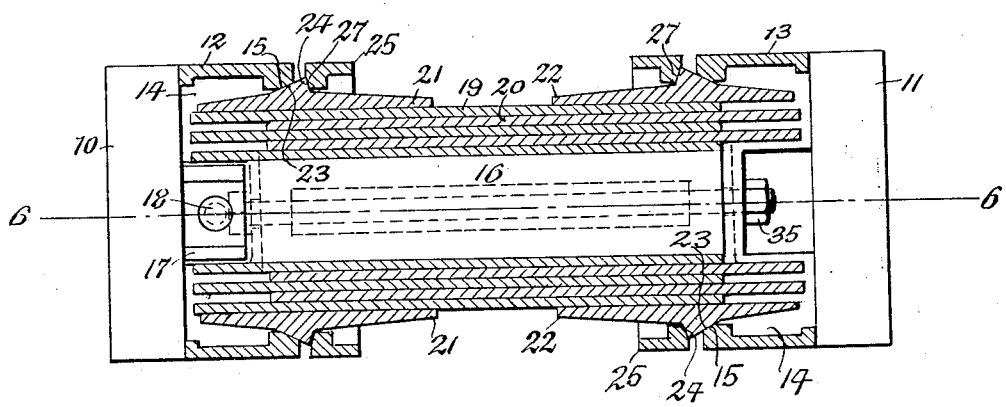
Figure 3 is a vertical longitudinal section of the absorber taken on line 3—3, Fig. 1.
Figure 4:
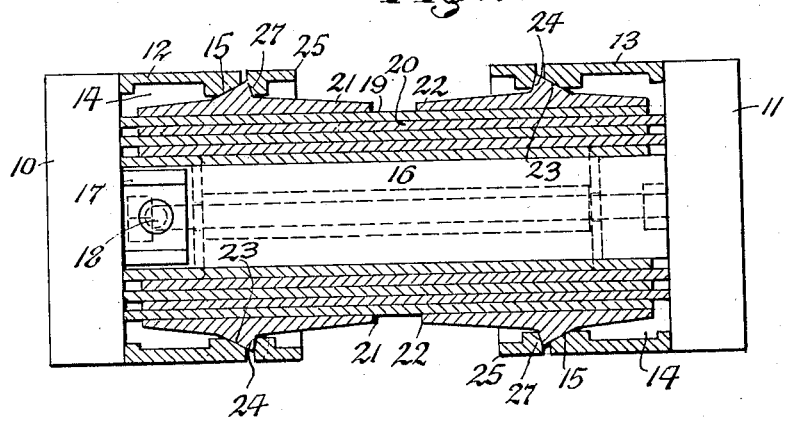
Figure 4 is a view similar to Fig. 3 but showing the absorber in a fully closed position.

The shock absorber comprises two outer thrust heads 12 and 13 or wedge casings preferably of cast metal, arranged transversely between the car sills and engaging their outer sides, respectively, with the inner sides of the followers. Each of these thrust heads is provided with a central opening 14, and on opposite sides of the inner end of this opening with inclined faces 15 which diverge inwardly, as shown in Figures 3 and 4.

Figure 6:
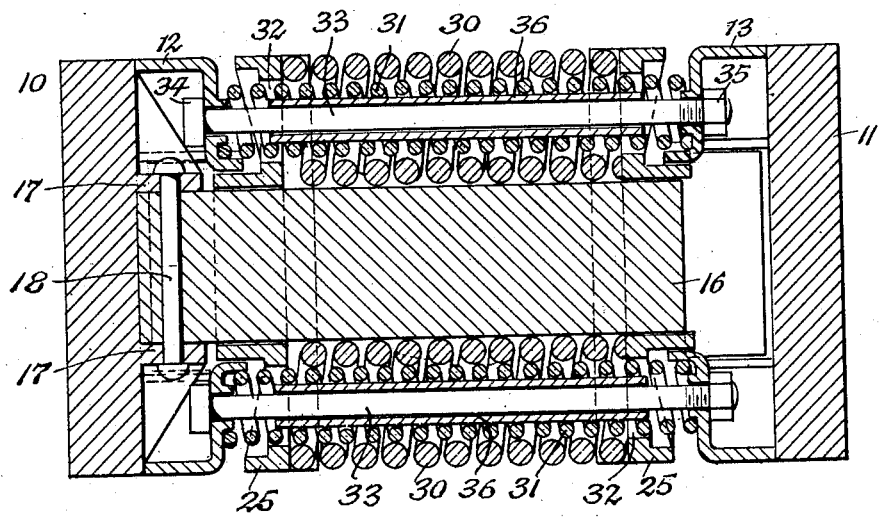
Figure 6 is a horizontal longitudinal section taken on line 6—6, Fig. 3.

One of these followers, for example the follower 10, is provided with a central longitudinal friction post or stem 16 which also serves as part of the means for limiting the closing movement of the draft gear. This friction stem or post is preferably rectangular in cross section and arranged at one end between a pair of lugs 17 on the follower 10 and secured to these lugs by means of a transverse rivet 18 as best shown in Figure 6. The opposite end of this friction post or stem is spaced apart from the other follower 11, in the opened or relaxed position of the draft gear, a distance equal to the extent which the followers are capable of moving one toward the other for completely closing the draft gear or rendering the same solid. On opposite sides of this friction post or stem are arranged two sets of friction plates each set consisting of two groups the members 19 and 20 of which are intercalated and the members of one group being adapted to be engaged at their outer ends by the inner side of one of the followers and the members of the other group being adapted to be engaged at their outer ends by the inner side of the other follower.

The innermost friction plates of both sets engage with the opposite sides of the friction post 16 and the sides of the outermost friction plates of both sets are engaged adjacent to opposite ends of the two sets of friction plates by means of wedge shoes or pressure plates 21, 22. The members of each pair of wedge shoes are arranged transversely opposite each other and produce a variable pressure upon the friction plates for causing them to engage with each other and with the friction post with varying degrees of friction and thus resist relative longitudinal movement of the same accordingly.

The members of each pair of wedge shoes are coupled with one of the thrust heads so as to be compelled to move lengthwise therewith most of the time and also to produce a wedging action of each thrust head against the respective pair of wedge shoes at the corresponding end of the sets of friction plates during the inward movement of the thrust head and thereby not only move the respective wedge shoes inwardly but also press the same transversely toward the longitudinal axis of the gear so that the several friction plates of both sets are pressed together and against the friction post. This is preferably effected by providing the outer side of each wedge shoe with a laterally projecting rib, which has an inclined face 23, these faces of the companion wedge shoes at one end of the draft gear diverging inwardly and engaging respectively with the inwardly diverging faces 15 of the respective thrust heads, as shown in Figures 3 and 4.

Each of said outer ribs of the wedge shoes is provided with an inclined face 24, these faces on the companion shoes converging inwardly.

Figure 5:
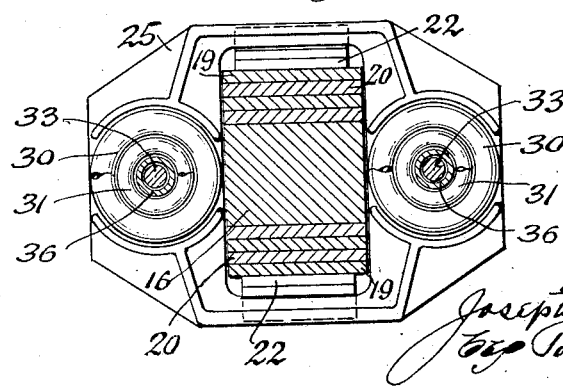
Figure 5 is a vertical section taken on line 5—5, Fig. 1.

Surrounding each pair of wedge shoes or pressure plates and the adjacent ends of the two sets of intercalated friction plates, and the friction post 16 between the same, is an intermediate cross head 25 having a central opening which receives the adjacent pair of wedge shoes and those parts of the two sets of friction plates arranged between these wedge shoes, and the adjacent part of the friction post arranged between the two sets of friction plates, as shown in Figures 3, 4 and 5. The inner sides of these intermediate cross heads are provided with inclined faces 27, which diverge outwardly and engage respectively with the inwardly facing converging inclined faces 24 on the adjacent wedge shoes.

Each of the intermediate cross heads 25 is provided on opposite sides of its center opening with two tappets or shoulders 28 which face outwardly and are adapted to engage with inwardly facing shoulders 29 formed on the outer parts of the longitudinal edges of one set of friction plates.

The inward movement of each intermediate cross head is effected by engagement of its inclined faces 27 with the inclined faces on the adjacent pair of wedge shoes 24 during the inward movement of the latter. The return or outward movement of each end thrust head and the intermediate cross head is effected by a spring pressure during relaxation of the draft gear. In the preferred construction shown in the drawings the resilient means which tend constantly to move the intermediate cross heads apart or outwardly consists of heavy helical main thrust springs 30 arranged lengthwise on opposite sides of the pairs of wedge shoes and sets of friction plates, each main thrust spring engaging at its opposite ends with the inner sides of the two cross heads on one side of the longitudinal axis of the draft gear, as shown in Figures 1, 5, 6 and 7.

The spring means which tend to yieldingly hold the end thrust heads 12 and 13 in the outermost position and to return the same to this position after they have been moved inwardly and the load on the gear has been released, preferably consist of two helical releasing springs 31, each of which is arranged within the main thrust spring 30 and passes at its opposite ends through openings 32 in the outer part of the cross heads and bears at its opposite ends against the inner sides of the end thrust heads on one side of the axis of the gear.

Undue separation of the end thrust heads and the parts associated therewith is prevented, when the gear is removed from the car, by tie rods 33 each of which extends through the two end thrust heads 12 and 13, and each of these rods being provided with shoulders 34 and 35 which are formed by a head and nut on this rod and engage with the outer sides of these end thrust heads, as best shown in Figure 6.

Each releasing spring 31 and its companion main thrust spring 30 may be held against buckling when subjected to a severe buffing or pulling action by a retaining device which is preferably constructed in the form of a tube 36 which is arranged within each of the releasing springs 31 and surrounds the respective stop rod 33 and is spaced at its opposite ends from the opposing inner sides of the end thrust heads 12 and 13 so that no end pressure is exerted against these retaining tubes when the gear is in its closed position, as shown in Figure 6.

Figure 7:
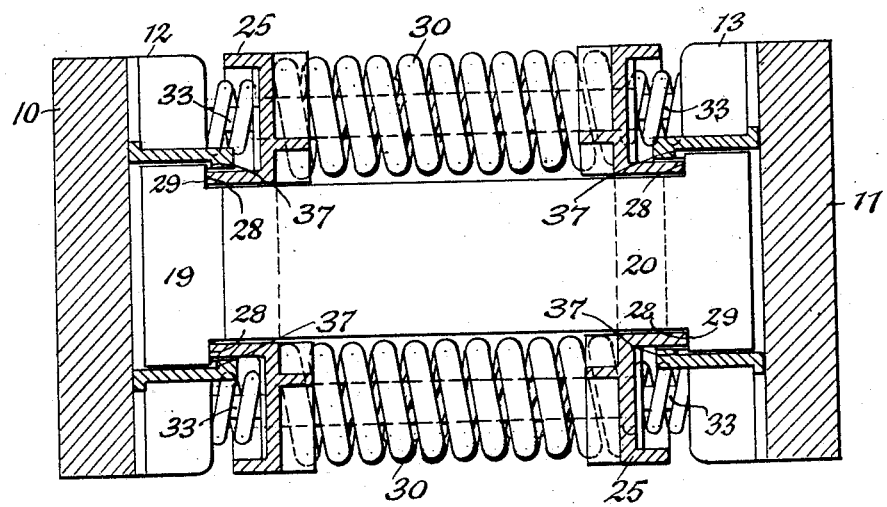
Figure 7 is a horizontal longitudinal section taken on line 7—7, Fig. 1.

For the purpose of compelling each of the thrust heads and the friction plates associated therewith, to move longitudinally outward together a certain distance, means are provided which preferably consist of outwardly facing shoulders 37 arranged on the end thrust heads at the inner part of the opening 14 therein and adapted to engage with part of the adjacent inwardly facing shoulders 29 on the longitudinal edges of the friction plates, as shown in Figure 7.

The operation of the shock absorber is as follows:—When the several members of the shock absorber are fully assembled and placed in the draft rigging of the car, the main thrust springs and the releasing springs are under an initial compression in the fully released or opened position of the gear, as shown in Figures 1, 3, 6 and 7. If a pulling or buffing load is applied to either of the followers sufficient to overcome the initial tension of the springs one of the end thrust heads will be first moved inwardly toward the other end thrust head a short distance independently of the companion friction plates, the extent of this independent movement being governed by the gap or slack between the moving follower and the outer end of the corresponding friction plates. At this time the compression of the release springs is increased by engagement therewith of the moving end thrust head, and compression of the main thrust spring is also increased by motion transmitted to the same from this end thrust head through the intervening wedge shoes. During this initial inward movement of one of the end thrust heads independently of the companion set of friction plates the engagement of the inclines 15 on the end thrust heads with the oppositely inclined faces 23 on the wedge shoes causes the latter to be pressed transversely inward and thereby increase the frictional contact between the several friction plates and between the innermost friction plates and the friction post or stem, thus increasing the frictional resisting capacity of these plates against moving one group of each of the sets of friction plates inwardly relatively to the companion groups of the other sets of plates. Immediately after this increased frictional engagement between the friction plates has been established the slack between the outer ends of the friction plates and the followers has been taken up and the moving follower, as it continues its inward movement thereafter, causes the set of friction plates in engagement therewith to also move inwardly against the increasing frictional resistance between the friction plates and also the constantly increasing resistance of the releasing springs and the main or thrust springs.

During the first part of the inward movement of two groups of friction plates with the companion moving follower, end thrust head, wedge shoes and cross head, the friction plates associated with the other follower are moved outwardly until their outer ends engage with the inner side of the relatively stationary follower, after which those friction plates which abut against the stationary follower move lengthwise no longer. At the same time the main thrust springs 30 exert a pressure against the relatively stationary cross head 25 and press the same inwardly so that a wedging action is exerted by the inclined faces 23 of the relatively stationary wedge shoes and the latter are pressed transversely inwardly and cause an increase in the frictional contact between those ends of the friction plates adjacent to the stationary follower at the same time that an increased frictional contact is produced between the end thrust head, cross head and wedge shoes adjacent to the movable follower, whereby the entire frictional surfaces of the friction plates and friction post are utilized most effectively.

When the load on the shock absorber is relieved or removed the releasing springs first force the end thrust heads apart, thereby reducing the transverse inward pressure of the friction plates against each other and against the friction post and relieving the frictional contact between these members. After the first part of the outward or release action of the gear has been thus effected by one end thrust head moving away from the other, the companion intermediate cross head moves outwardly under the action of the main thrust springs and engages its shoulders 37 with the shoulders 29 of the companion set of friction plates, thereby carrying the latter outwardly. At the same time the other friction plates associated with the relatively stationary follower 11 are moved inwardly away from the latter by frictional contact between the several friction plates, so as to provide a slack space between the outer ends of the last mentioned friction plates and the respective stationary follower preparatory to effecting the next following closure of the shock absorber.

The angle of the co-operating inclines 15 and 23 is such that a pronounced wedging action occurs between the main thrust heads 12, 13 and the wedge shoes 21, 22, upon moving one follower inwardly relatively to the other. The co-operating inclined surfaces 24, 27 between the wedge shoes 21, 22 and the intermediate cross heads, however, are more obtuse and in practice at such an inclination, preferably about 15 degrees, so that the same in effect operate as angles of repose or neutral angles which do not produce any distinct wedging effect but merely relieve the frictional engagement between the wedge shoes and the intermediate cross heads and enable the wedge shoes to create or set up the pressure against the friction plates more promptly than if the shoe engaged by means of square shoulders with the intermediate cross heads.

By arranging a main thrust spring around each of the releasing springs, a structure is obtained which is more compact and stronger and less liable to give way under the severest usage to which the absorber may be subjected in actual practice.

Moreover, the employment of a central post or stem in connection with the friction plates causes the strain, when the shock absorber becomes solid due to an overload, to be brought to the center line of the draft gear and also permits of arranging the friction plates and stop members more compactly.

Furthermore the shoulders 37 on the main thrust heads by engaging the shoulders 29 on the friction plates limit the release action of the moving set of friction plates and compel a similar release action on the other relatively stationary friction plates, thus insuring uniform release throughout the entire mass of friction plates and also causing the load of the release spring to be brought to bear or find a support on the shoulders 29 of both sets of intercalated friction plates.

I claim as my invention:—

1. A shock absorber comprising opposed followers, a longitudinal post secured to one of said followers and spaced from the other follower in the open position of the absorber, a plurality of sets of friction plates arranged on opposite sides of said post and each set consisting of two groups of such plates which are intercalated and which are adapted to be engaged, respectively, at their outer ends by said followers and to be moved lengthwise thereby, and means for impressing a lateral pressure on said plates and post comprising shoes engaging the outer sides of the opposite ends of said sets of friction plates, and means for transmitting a wedge action from said followers to said shoes.

2. A shock absorber comprising opposed followers one of which is provided on its inner side with a pair of lugs, a longitudinal post arranged at one end between said lugs and secured thereto and spaced at its opposite end from the other follower in the open position of the absorber, a plurality of sets of friction plates arranged on opposite sides of said post and each set consisting of two groups of such plates which are intercalated and which are adapted to be engaged, respectively at their outer ends by said followers and to be moved lengthwise thereby, and means for impressing a lateral pressure on said plates comprising shoes engaging the outer sides of the opposite ends of said sets of friction plates, and means for transmitting a wedge action from said followers to said shoes.

3. A shock absorber comprising opposed thrust heads adapted to engage with the inner sides of followers which are movable toward and from one another, an abutment member, means for securing said abutment member to one of said heads, a plurality of groups of intercalated friction plates, one group adapted to be engaged by one follower and the other group by the other follower and to be moved lengthwise, thereby, certain of said plates being on opposite sides of said abutment member and in contact therewith, wedge shoes engaging with the sides of said groups of plates and having wedging engagement with said thrust heads, cross heads engaging with said wedge shoes, a releasing spring interposed between said thrust heads, and a thrust spring between said cross heads.

4. A shock absorber comprising opposed thrust heads adapted to engage with the inner sides of the followers which are movable toward and from one another, a plurality of groups of intercalated friction plates, one group adapted to be engaged by one follower and the other group by the other follower and to be moved lengthwise thereby, wedge shoes engaging with the sides of said groups of plates and having wedging engagement with said thrust heads, cross heads engaging with said wedge shoes, a releasing spring interposed between said thrust heads, a thrust spring encircling said releasing spring and interposed between said cross heads, and a tie rod having shoulders adapted to engage with the outer side of said thrust heads.

5. A shock absorber comprising opposed thrust heads adapted to engage with the inner sides of followers which are movable toward and from one another, a plurality of groups of intercalated friction plates one group adapted to be engaged by one follower and the other group by the other follower and to be moved lengthwise thereby, wedge shoes engaging with the side of said groups of plates and having wedging engagement with said thrust heads, cross heads engaging with said wedge shoes, a releasing spring interposed between said thrust heads, a thrust spring encircling said releasing spring and arranged outwardly of said plates and interposed between said cross heads, a tie rod extending through said releasing spring and thrust heads and having shoulders adapted to engage with the outer side of said thrust heads, and a tubular retainer arranged within said releasing spring and around said tie rod and adapted to be spaced apart at opposite ends from said thrust heads.

6. A shock absorber comprising opposed followers which are movable one toward and from another, a longitudinal post secured at one end to one of said followers and spaced at its opposite end from the other follower in the open position of the absorber, a plurality of sets of friction plates arranged on opposite sides of said post, certain of said plates engaging said post on opposite sides thereof, each set consisting of two groups of intercalated plates, one group being engaged by one follower and the other group by the other follower and being moved lengthwise thereby, thrust heads engaging with the front ends of said followers, wedge shoes engaging with the outermost plates of said sets and having wedging engagement with said thrust heads, cross heads engaging with said wedge shoes, tie rods arranged lengthwise on opposite sides of said sets of friction plates and shoes and having shoulders engaging with the outer sides of said thrust heads, tubular retainers arranged on the tie rods and adapted to be spaced apart at opposite ends from said thrust heads, releasing springs encircling said tubular retainers and tie rods and passing through said cross heads and bearing at opposite ends against the inner sides of said thrust heads, and thrust springs surrounding the releasing springs and bearing at their opposite ends against the inner sides of said cross heads.

7. A friction draft gear including a center column; relatively longitudinally movable intercalated friction plates supported on the sides thereof; wedge blocks in engagement with the plates; a wedging actuator in engagement with and laterally embracing the blocks and pressing inwardly thereon and against the plates in response to draft strains, the blocks moving relatively to the actuator so that friction thus set up increases the wedging pressure on the plates during closure and decreases the pressure during release, said blocks being so arranged in relation to the adjacent plates that friction therebetween increases the wedging pressure during closure and decreases it during release; spring means acting on the wedging actuator; and means for returning the plates to release position.

8. A friction draft gear including abutment means, groups of relatively longitudinally movable intercalated friction plates supported on the sides thereof, means including longitudinally movable wedging shoes for setting up pressure on the plates for forcing the same laterally inwardly against said abutment means during compression of said gear, follower means for engaging the outer ends of certain of said plates for forcing the same longitudinally inward during compression of said gear, means for resiliently resisting the inward movement of said shoes and releasing means independent of said second named means for moving said follower means outwardly for releasing the lateral pressure on said plates.

In testimony whereof I affix my signature.

JOSEPH M. HALL.